US009984080B2

(12) United States Patent
Stakutis et al.

(10) Patent No.: US 9,984,080 B2
(45) Date of Patent: May 29, 2018

(54) EFFICIENT NON-DATABASE FILE-EXPIRATION MANAGEMENT FOR DOCUMENT RETENTION

(75) Inventors: Christopher J. Stakutis, Concord, MA (US); Kevin M. Stearns, Maynard, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1615 days.

(21) Appl. No.: 11/461,685

(22) Filed: Aug. 1, 2006

(65) Prior Publication Data

US 2008/0034003 A1 Feb. 7, 2008

(51) Int. Cl.
*G06F 17/30* (2006.01)

(52) U.S. Cl.
CPC .... *G06F 17/30085* (2013.01); *G06F 2216/09* (2013.01)

(58) Field of Classification Search
CPC ................................................. G06F 17/30085
See application file for complete search history.

(56) References Cited

U.S. PATENT DOCUMENTS

| | | | | |
|---|---|---|---|---|
| 5,129,083 | A * | 7/1992 | Cutler et al. | 707/103 R |
| 6,247,012 | B1 * | 6/2001 | Kitamura et al. | |
| 6,917,949 | B1 | 7/2005 | Nguyen | |
| 7,376,681 | B1 * | 5/2008 | Todd et al. | 707/205 |
| 2002/0138762 | A1 * | 9/2002 | Horne | 713/201 |
| 2003/0182332 | A1 * | 9/2003 | McBrearty et al. | 707/206 |
| 2004/0267705 | A1 | 12/2004 | Lemus et al. | |
| 2005/0055519 | A1 * | 3/2005 | Stuart et al. | 711/159 |

(Continued)

FOREIGN PATENT DOCUMENTS

| | | |
|---|---|---|
| JP | 3019044 A | 1/1991 |
| JP | 4369743 A | 12/1992 |

(Continued)

OTHER PUBLICATIONS

PCT/EP2007/057853 International Search Report and Written Opinion, 15 pages.

(Continued)

*Primary Examiner* — Mohammad S Rostami
(74) *Attorney, Agent, or Firm* — Cantor Colburn LLP; David Zwick (57) ABSTRACT

Disclosed are a method, system, program and data structure for implementing a records retention policy by storing selected files for designated lengths of time and then deleting them only when that time has passed. Embodiments of the invention perform this function in an efficient database-free manner. Embodiments of the invention can perform this function by utilizing existing storage directory tree functionality provided by any computer operating system organized under a retention directory coupled with a mechanism for preventing unauthorized deletions of files designated for retention. Expiration of retained files may be managed through directory structure using directory names corresponding to expiration dates determined from identified retention periods for retained files. Files may be further protected from erasure by a kernel mode process which prevents erasure of any files contained in the retention directory.

14 Claims, 5 Drawing Sheets

File Tree Structure for Retained Files (56) References Cited

U.S. PATENT DOCUMENTS

| | | | |
|---|---|---|---|
| 2005/0076042 A1* | 4/2005 | Stakutis et al. | 707/100 |
| 2005/0076066 A1* | 4/2005 | Stakutis et al. | 707/200 |
| 2005/0097260 A1* | 5/2005 | McGovern et al. | 711/100 |
| 2005/0160427 A1* | 7/2005 | Ustaris | 718/100 |
| 2005/0240621 A1* | 10/2005 | Robertson et al. | 707/102 |
| 2006/0010301 A1* | 1/2006 | Yagawa | 711/163 |
| 2006/0080517 A1* | 4/2006 | Brown | 711/163 |
| 2006/0085487 A1* | 4/2006 | Hara et al. | 707/200 |
| 2006/0095380 A1* | 5/2006 | Hsu et al. | 705/57 |
| 2006/0190925 A1* | 8/2006 | Ishii et al. | 717/106 |
| 2007/0061373 A1* | 3/2007 | Kilday | 707/200 |

FOREIGN PATENT DOCUMENTS

| | | |
|---|---|---|
| JP | 5046446 A | 2/1993 |
| WO | WO 00/58865 | 10/2000 |

OTHER PUBLICATIONS

Sharick, "Expiration Dates and Retention Periods: Keeping Your Disks Clean," VAX Professional, M Systems, Spring House, PA, US, vol. 10, No. 3, Jun. 1988, pp. 15-17.

Santry et al., "Deciding When to Forget in the Elephant File System," Proc. of the ACM Symp. on OS Principles, XX, XX, vol. 33, No. 5, Dec. 1999, pp. 110-123.

\* cited by examiner

FIG. 1 — File Tree Structure for Retained Files

FIG. 2 — File Tree Structure for Expiration Management

FIG. 3
File Retention and Expiration Management System

EFFICIENT NON-DATABASE FILE-EXPIRATION MANAGEMENT FOR DOCUMENT RETENTION

BACKGROUND OF THE INVENTION

1. Field of the Invention

The present invention relates to a method, system, and program for managing document retention in a storage system without the overhead of a document management database.

2. Description of the Related Art

Modern business practices and the regulatory environment require that documents be retained for certain designated lengths of time. Such document retention may be performed electronically, with the actual retention being done on computer controlled mass storage devices. When retention is performed electronically, it is still necessary to manage the process to ensure that files are not inadvertently deleted before the retention period has expired. Premature deletion of files can expose the business to unfortunate legal consequences if a required document is no longer available. It is further necessary to ensure that once the expiration date has been reached, that the file is then actually deleted. Failure to do so would unnecessarily fill up storage media, adding to the overall cost of records retention. In addition, document retention beyond the legally required period may expose a company to potential liability; companies often want all documents deleted the moment it is legally unnecessary to have them retained.

One approach to the problem document retention is shown in U.S. Pat. No. 6,917,949 by Nguyen, issued Jul. 12, 2005 and entitled "Temporary LOBs Directory Management". This patent describes a method in which a system level utility monitors file usage and deletes files which have not been accessed for a designated period of time. This approach is not suitable for the needs of records retention, as it does not allow for the situation in which a file may be retained for a period of time to meet regulatory requirements but is never accessed during that period.

Another approach is that of U.S. Patent Application 20030182332 by McBrearty et al., published Sep. 25, 2003, and entitled "System and Method for Designating and Deleting Expired Files." This disclosure describes a database-style approach in which a user may include a expiration date in the metadata associated with a file. That is, an expiration date is stored along with file identification data maintained by the file system. A system program periodically sorts through all files on a storage media and compares the expiration date, if any, of the file with the current date. If the current date is later than the expiration date for a particular file, then that file will be deleted. While this approach provides the flexibility lacking in the previously described approach, implementation can be unduly burdensome as all files on a disc must be regularly checked and the expiration date of each compared to the current date.

Also, U.S. Patent Application 20040267705 by Lemus et al., published Dec. 30, 2004, and entitled "Memory with File Deletion System," appears to describe a memory comprising a storage medium that includes a first file and first information associated with the first file and a controller coupled to the storage medium. The controller is configured to access second information and is configured to cause the first file to be deleted in response to comparing the first information to the second information.

There is a need in the art for methods, systems and programs for document retention that allow for the efficient management of retained documents. Furthermore, there is a need for such methods, systems and programs to operate without using a conventional database program where document expiration information is tracked in one or more database files. As detailed hereafter, these and other needs are met by the present invention.

SUMMARY OF THE INVENTION

Provided are a method, system, program and data structure for implementing a records retention policy by storing selected files for designated lengths of time and then deleting them when that time has passed but not before. Unlike other approaches to this problem of record retention, embodiments of this invention perform the function in an efficient database-free manner which makes it suitable for those situations in which a large database, requiring extensive system resources, is unwieldy, inefficient, and cumbersome. Embodiments of the invention can perform this function by utilizing existing storage tree functionality provided by any computer operating system coupled with a mechanism for preventing unauthorized deletions of files designated for retention.

One particular benefit of embodiments of the invention is that the management software only needs to determine if there are files to be deleted on or before the date the management software is running. The list of files to be deleted on a given date is independent of the duration of the retention period for that particular file. Embodiments of the invention can relieve the expiration management software of the computational burden of searching an entire directory for files to be deleted. Instead, it only must search for identification files located in date-designated directories. Once such a file is located, it will include a list of all files to be deleted on that date.

The expiration management software can further comprise code running in kernel mode which will prevent any deletion of files saved in such a retention directory except by the expiration management software itself.

A typical embodiment of the invention may comprise data structure, including a file retention tree structure having a retention directory comprising at least one retained file to be retained and protected from erasure for a retention period associated with the retention directory, and a file expiration tree structure having an expiration directory associated with a file expiration date and an expiration file residing in the expiration directory. The expiration file contains a file identifier of the at least one retained file to be erased on the file expiration date. The retention directory may be further protected from erasure by a kernel mode process that prevents erasure of any files contained in the retention directory.

The expiration tree structure may comprise nested directories where lower directories are named for smaller time increments than higher directories. For example, the nested directories may comprise a year, a month, and a day sequentially named. The retention directory may include a retention period directory having a retention period in a name of the retention period directory.

In further embodiments, the file expiration date is a calculated value calculated by adding the retention period to a saving date of the at least one retained file. The saving date may correspond to a last modified date when the at least one retained file was modified before being saved for retention or to a last saved date when the at least one retained file was saved for retention. Further embodiments of the invention are directed to a system, computer program and certain methods described hereafter which may all be further modified consistent with the data structure described above.

A file expiration management system embodiment of the invention includes at least one computer having a processor, operating system, memory, expiration management software stored in the memory and running on the processor under the operating system, and at least one mass storage device capable of storing data files from the computer, the mass storage device further comprising a data structure controlled by the running expiration management software. The data structure comprises a file retention tree structure including a retention directory comprising at least one retained file to be retained and protected from erasure for a retention period associated with the retention directory, and a file expiration tree structure including an expiration directory associated with a file expiration date and an expiration file residing in the expiration directory, the expiration file containing a file identifier of the at least one retained file to be erased on the file expiration date. The system may be modified consistent with the method and program embodiments of the invention described herein.

For example, the file management software of the file expiration management system may comprise program instructions to perform a file retention method including the steps of saving the at least one retained file in the retention directory residing in the file retention tree structure, the retention directory including a designation for the retention period for which the at least one retained file is to be stored after a file saving date of the at least one retained file, calculating an expiration date for the at least one retained file by adding the retention period to the file saving date, determining whether an expiration directory exists within the file expiration tree structure designated for the calculated expiration date, determining whether an expiration file within the expiration directory exists, and adding a file identifier of the at least one retained file to the expiration file. Embodiments of the invention also encompass a computer program embodied on a computer readable medium, comprising program instructions for performing this file retention process.

In addition, the file management software of the file expiration management system may include program instructions to perform a file deletion method comprising the steps of checking the file expiration tree structure at a predetermined time interval to identify an earliest expiration directory associated with an earliest expiration date, comparing the earliest expiration date of the earliest expiration directory with a current date, determining if there is an expiration file associated with the earliest expiration directory if the expiration date associated with said earliest expiration directory is at least as early as the current date, reading and deleting any retention files that can be found that are named within the expiration file, and deleting the earliest expiration directory and any contents thereof containing the expiration file referencing the deleted retention files. Similarly, embodiments of the invention also encompass a computer program embodied on a computer readable medium, comprising program instructions for performing this file deletion process.

In another embodiment, a method of increasing a retention period of a retained file, comprises the steps of identifying the retained file in a first retention directory of a file retention tree structure associated with a first retention period, identifying a second retention directory of the file retention tree structure associated with a second retention period, comparing the first retention period with the second retention period to determine that the second retention period is at least as long as the first retention period, copying the retained file from the first retention directory to the second retention directory, deleting the retained file from the first retention directory, and updating an expiration file residing in an expiration directory associated with a file expiration date corresponding to the second retention period to include a file identifier of the retained file to be erased on the file expiration date. This method may include returning an error message and not performing the steps of copying and deleting the retained file if it is determined that the second retention period is shorter than the first retention period. Here also, the expiration directory may reside in an expiration tree structure comprising nested directories where lower directories are named for smaller time increments than higher directories.

BRIEF DESCRIPTION OF THE DRAWINGS

Referring now to the drawings in which like reference numbers represent corresponding parts throughout.

DETAILED DESCRIPTION

In the following description of the invention, which includes a description of the preferred embodiment, reference is made to the accompanying drawings which form a part hereof, and in which is shown by way of illustration specific embodiments in which the invention may be practiced. It is to be understood that other embodiments may be utilized and structure changes may be practiced. It is to be understood that other embodiments may be utilized and structural changes may be made without departing from the scope of the present invention.

1. Overview

Provided are a method, system, program and data structure for implementing a records retention policy by storing selected files for designated lengths of time and then deleting them when that time has passed but not before. Embodiments of the invention can perform this function by utilizing existing storage directory tree functionality provided by any computer operating system coupled with a mechanism for preventing unauthorized deletions of files designated for retention.

Management software employing an embodiment of the invention only needs to determine if there are files that have expired and need to be deleted on or before the date the management software is running. If there are such files, then it retrieves a list of those files and then deletes them. The list of files to be deleted on a given date is independent of the duration of the retention period for that particular file. That is, a document to be retained "X" years will be deleted on the same date as a document to be retained "X−1" years, but stored one year later. Embodiments of the invention can relieve the expiration management software of the computational burden of searching an entire directory for files to be deleted. Instead, the expiration management software is only required to search for identification files located in date-designated directories. Once such a file is located, it will contain a list of all files to be deleted on that date. Thus, embodiments of the invention use the files system as a "database" by creating a file system tree organized by date of expiration for retained files. Expiration files are created within the file expiration tree structure that list the retained files to be deleted on the particular date (indicated by the expiration directory within the file expiration tree structure). On a periodic basis (e.g. daily) the software may examine the expiration directory of that date (and any earlier) and then attempt to delete all retained files identified in the expiration file of the expiration directory.

Typically, whenever a file is added to a retention tree (e.g. "C:\KEEPSAFE\RETAIN 3 YEARS\ . . . "), the file retention management software can automatically calculate the expiration date. For example, the software may simply add the stated retention period to the last-modified date of the retained file. Then an entry is made in a serial log/xml expiration file in the appropriate expiration directory of the expiration tree structure. The expiration tree structure is structured by time, most likely with these directory nodes in order such as year, month, and day. However, any useful combination of time denominations may be employed. Accessing the expiration file (e.g. for the purpose of adding an entry) will be extremely fast, particularly compared to the alternative of managing such dates in a true database. Embodiments of the invention employ normal directory/file operations and likely involve only a small number of directories to be traversed. Ordinary file systems are extremely efficient at rapidly accessing their nodes. Similarly, accessing that expiration file (e.g. for the purpose of delete expired retained files on a given day) will be extremely fast for the same reasons.

The expiration file itself can be a file that simple serially accumulates additional entries of retained files designated for expiration on a particular day, e.g. a text or XML format. This benefit is derived from the use of the expiration directory tree structure to organize the file expirations (with distinct expiration files as "leaf" nodes of sequential file lists identified to particular days). If a single expiration file were used to track all file expirations instead without an expiration directory tree structure, such an expiration file would require sorting by expiration date. For example, a first retained file added today designated for a 10-year retention will occur in the list before a second file added even a year later designated for only a 3-year retention. However, the second file will occur before the first file. In order to delete files that expire on a given day, it would be necessary to first sort the list by expiration to locate the files to be deleted. In contrast, the present invention obtains expiration sorting automatically through the use of the expiration directory tree structure in which only files having a common expiration day are identified in separate expiration files. Accordingly, there is no need to sort or index or perform database-like operations on the expiration file contents. From this it can be seen that the node (directory) hierarchy of the expiration tree structure essentially accomplishes the database-like indexing. Thus, the expirations files can be simple sequential files.

A user of the invention may call upon expiration management software to save a file for a predetermined retention period. The software will then save that file in a user-determined subdirectory of a directory tree that includes in its name the retention period, for example "3 years". Then the expiration management software can then calculate an expiration date for the file by adding the retention period to the date the file was last modified or saved, information that is created and retained by most computer operating/file systems. Then the expiration management software will search an expiration tree to locate a subdirectory for that particular expiration date. For example, a subdirectory for files to be deleted on Jun. 3, 2008 might be of the form "C:\KEEPSAFE\EXPIRATIONS\2008\JUNE\3". If no tree/directory for a particular date exists, the expiration management software will create one.

Next the software will look in the tree for the particular expiration date and determine if there is an expiration file in it. If there is no such expiration file, it will create one. Then the software will write in that expiration file the name and location identifier of the file to be deleted on that particular date. For example, if a file named "TAX RETURN" is to be retained for three years and returned in a sub-directory "MYFILES" within the "Retain 3 years" tree, the software would add the entry "C:\KEEPSAFE\RETAIN 3 YEARS\MYFILES\TAX RETURN.DOC" to the expiration file.

The expiration management software further contains code running in kernel mode which will prevent any deletion of files saved in such a retention directory except by the expiration management software itself.

Deletion of expired files may be accomplished by the expiration management software in the following manner. At regular intervals, the software will search subdirectories within a predefined expiration directory tree and identify any directories pertaining to dates earlier than the current date. For example, on Jan. 1, 2005 the management software would search through a C:\KEEPSAFE\EXPIRATIONS tree to locate any directories with names less than or equal to 2005. If it located any such directories, it would then search the next level of directories to identify any named for months earlier or the same as the current month. If it located any such directories, it would then search for any nested directories less than or equal to the current date. Then it would read any files in such located directories and delete any saved files listed therein. Finally, it would delete any such located files, as well as the expiration subdirectories containing them.

2. File Tree Structures for File Retention Management

In general, embodiments of the invention employ two file tree structures (which may share a common directory) in order to manage file retention. One file tree structure, the file retention tree structure, includes the actual saved files organized according to one or more specified retention periods. The other file tree structure, the file expiration tree structure, include a cross-reference actual files within the file retention tree structure and is organized according to one or more expiration dates of the actual files. It should be noted that as used in this application, a first directory (i.e. parent directory) may be said to include another directory (i.e. subdirectory) and/or a file if the subdirectory or file is stored either directly within the first directory or within any subdirectory below the first directory; all elements below the first directory are included in the first directory.

Figure 1:
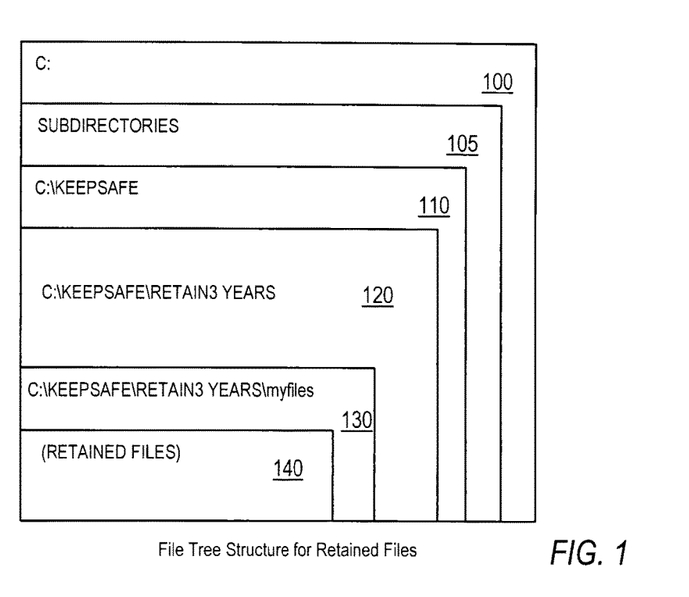
FIG. 1 illustrates an exemplary file retention tree structure.

FIG. 1 is an exemplary file retention tree structure for retaining files. At the highest level of the structure is the root directory 100. In an exemplary Windows system, the highest level may be a hard disk drive labeled "C:". One skilled in the art will recognize that different computer systems may label the root directory of a mass storage device in different manners. Below the root directory are intervening subdirectories 105. For convenience, a parent directory is a directory with subdirectories below it, or no subdirectories. A parent directory may be a subdirectory of the root directory or a subdirectory below that. Subdirectories may be nested within other broader directories, or they might not exist. In general, the term "directory" is generic and may also refer to a parent directory or a subdirectory depending upon its relationship to other directories as will be understood by one skilled in the art.

In some embodiments of the invention, the file structure contains a retention directory 110 which exists to include all files to be retained as well as files for dealing with the management of the retention process. In one embodiment of the invention, this retention directory 110 may be named "KEEPSAFE", but one skilled in the art will recognize that any permissible name will suffice. The broadest retention directory 110 further possesses the property that files may not be deleted from it or any of its subdirectories except by processes or software routines specifically permitted to do so.

Either directly beneath the root directory, or within one or more subdirectories is one or more directories 120 for retaining files for a specified period, e.g. \KEEPSAFE\RETAIN3 YEARS\, which may be termed retention period directories 120. Thus, the retention directory 110 may include one or more retention period directories 120 each associated with a specified period of retention, e.g. retained 3 years. Typically, the period of retention may be measured in years, but one skilled in the art will recognize that any reasonable length of time such as decades, months, weeks, or other time units will be applicable. In some embodiments of the invention the retention period directories 120 may include in their names the length of time files stored within it are to be retained. In other embodiments, the subdirectory name may be linked to a listing within a controlling software program which would associate files and subdirectories within that with a retention period. In other embodiments of the invention users may find it convenient to insert one or more nested subdirectories 130 below the one or more retention period directories 120 which may be used to further group the retained files. For example, the nested subdirectory 130, \MYFILES\, may be inserted below the retention period directory 120, \RETAIN3 YEARS\. Finally, the actual retained files 140 are stored within the one or more retention period directories 120 (possibly within the one or more nested subdirectories 130). For example, the retained file, AFFIDAVIT.DOC, may be stored at C:\KEEPSAFE\RETAIN3 YEARS\MY FILES\AFFIDAVIT.DOC, indicating that it is under the group, "MY FILES", to be retained for three years. One skilled in the art will recognize that the file structure depicted is exemplary, and that any file structure in which files are retained in directories which serve to identify the duration of the retention period will be within the scope of the invention.

Furthermore, embodiments of the invention also employ a file expiration tree, a file system tree organized by date of expiration for retained files. Files are created within the file expiration tree list files that are to be deleted on a specific date and/or time.

Figure 2:
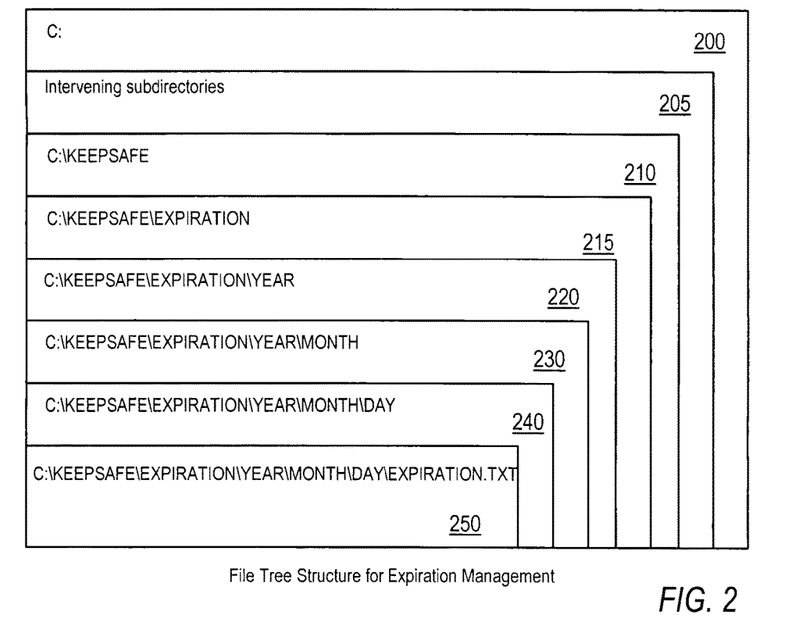
FIG. 2. illustrates an exemplary file expiration tree structure.

FIG. 2 is an exemplary file expiration tree structure for expiration management. At the highest level of the structure is the root directory 200. In an exemplary Windows system, the highest level may be a hard disk drive labeled "C:". One skilled in the art will recognize that different computer systems may label the root directory of a mass storage device in different manners. Below the root directory may exist intervening subdirectories 205. Such subdirectories 205 may be nested within other broader directories, or they might not exist. In some embodiments of the invention, the file structure contains a directory 210 which exists to include the expiration cross reference to all files to be retained (and stored under the retention treed structure) as well as files dealing with the management of the retention process organized by expiration. Note that this directory 210 may be common with the retention directory 110 employed in the retention tree structure described in FIG. 1, e.g. \KEEPSAFE\.

Furthermore, in certain embodiments of the invention, the files structure may further include an expiration directory 215 which serves to store one or more files related to the deletion of expired files organized by their expiration date. Either directly within the expiration directory 215, or within one or more subdirectories, is one or more expiration files 250 which contain cross reference information to identify actual files (e.g. in the file retention tree structure) which will expire at a particular time, for example a particular year such as 2008.

In further embodiments of the invention users may find it convenient to insert nested subdirectories 220, 230, 240 below the expiration directory 215. In the example shown in FIG. 2, the nested subdirectories 220, 230, 240 indicate a directory date format nesting a day directory 240 within a month directory 230 within a year directory 220. For example, a directory nesting of \2008\JULY\8\ corresponds to an expiration date of Jul. 8, 2008 and includes an expiration file 250 (e.g. EXPIRATION.TXT) which lists files that expire on that date. A different expiration file 250 may be stored in directly under \2008\ which corresponds to an expiration date of the year 2008. For example, expiration file in the \2008\ directory may be acted on to delete all files identified therein on Jan. 1, 2008. Similarly, another expiration file may be located within the \2008\JULY\ directory that identifies files to expire in July 2008 without regard to a particular day. Such identified files may be deleted on Jul. 1, 2008. It should also be noted that the deletion process may be spread out by any arbitrary convention to prevent overloading on key days such as the first of the year or the first of a given month. These nested subdirectories 220, 230, 240 may provide coarse or fine resolution as to expiration dates depending upon the number of nested directory levels used and the desired format with the applicable expiration file 250 stored at the desired level. One skilled in the art will recognize that the file structure depicted is exemplary and that any file structure in which files are retained in directories which serve to locate files which expire and are to be deleted on a particular year, month, day, or other timing event will be within the scope of the invention. In an exemplary embodiment of the invention, subdirectories and their contents are protected from deletion by any software process not specifically authorized to do so. That protection may be implemented by a kernel mode process but one skilled in the art may recognize other alternatives.

3. File Retention Management System

Figure 3:
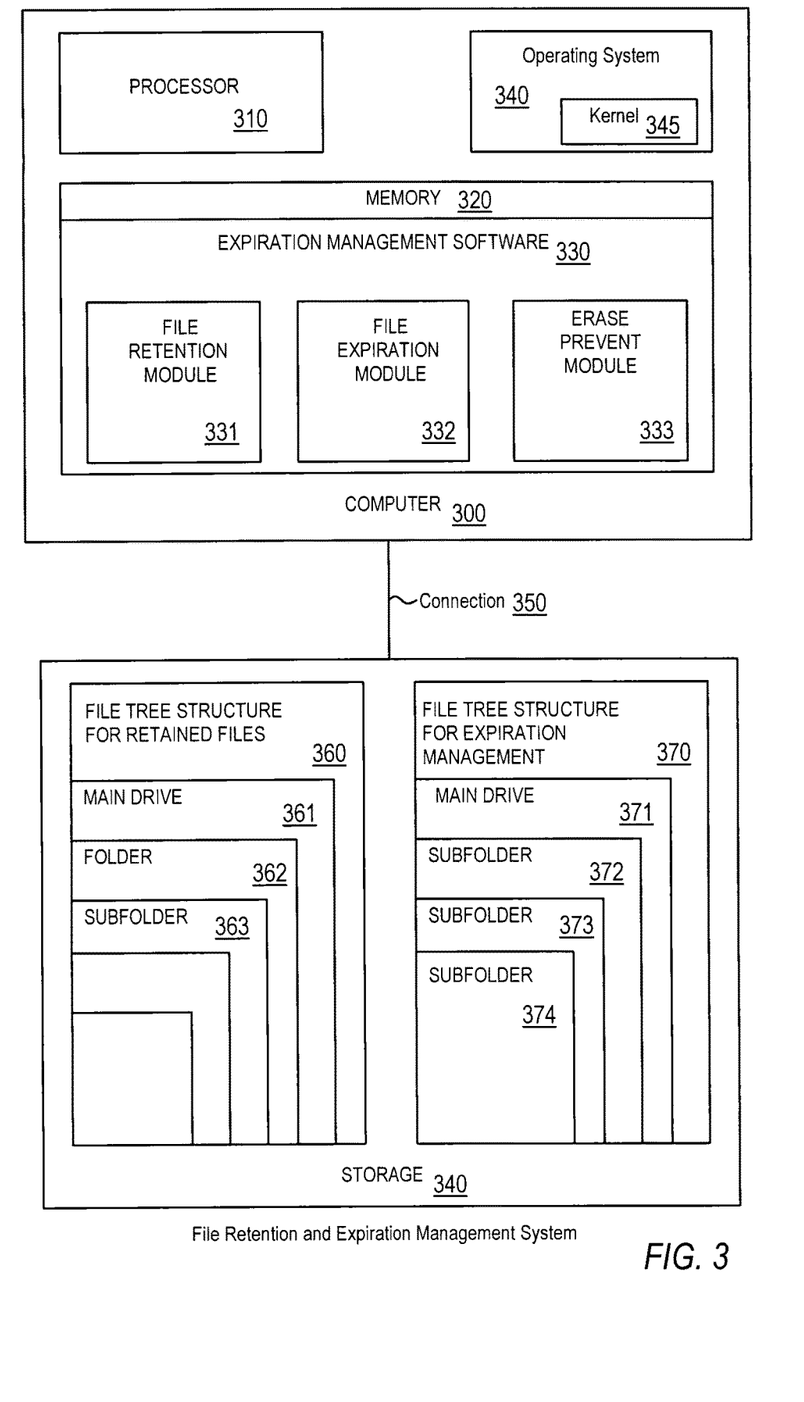
FIG. 3 illustrates an exemplary file retention and expiration management system.

FIG. 3 is block diagram of an exemplary file retention and expiration management system. Computer 300 may be a personal computer or any computer of greater capacity, either single user or multi-user. The computer 300 comprises a processor 310 and memory 320. Expiration management software 330 comprising program instructions is contained in the memory 320 and executed by the processor 310. In one embodiment of the invention the expiration management software 330 includes a file retention module 331. That module 331 acts to executes program instructions for the steps storing files for retention as described in FIG. 4. In an embodiment of the invention, the expiration management software 330 further includes a files expiration management module 332 which executes program instructions to perform the method described hereafter in FIG. 5. In an embodiment of the invention, the expiration management software 330 further includes an erasure prevention module 333 which executes program instructions to prevent retained files from being erased except by the expiration management software itself. In an embodiment of the invention, the erasure protection module 333 may be execute program instructions within the computer operating system 340. In an embodiment of the invention, the erasure protection module 333 may further execute program instructions within the operating system kernel 345.

Storage 340 may be any mass storage device or devices. In one embodiment storage 340 may be a hard disk drive physically connected 350 by a bus to a processor, forming a computer such as the modern personal computer. In other embodiments of the invention storage 340 may be multiple mass storage devices that are resident in locations different from the computer 300 and connected 350 by any known means. Storage 340 will contain a file tree structure for retained files 360, which is identical to that described in FIG. 1. Storage 340 will also contain a file tree structure for expiration management 370 which is identical to that described in FIG. 2.

Finally, storage 340 is operationally connected to the computer 300 by a connection 350. Connection 350 may be an internal bus within a computer, or a network connecting a computer to network storage devices, or other structures performing substantially similar functions.

4. File Retention Management System Methods

Figure 4:
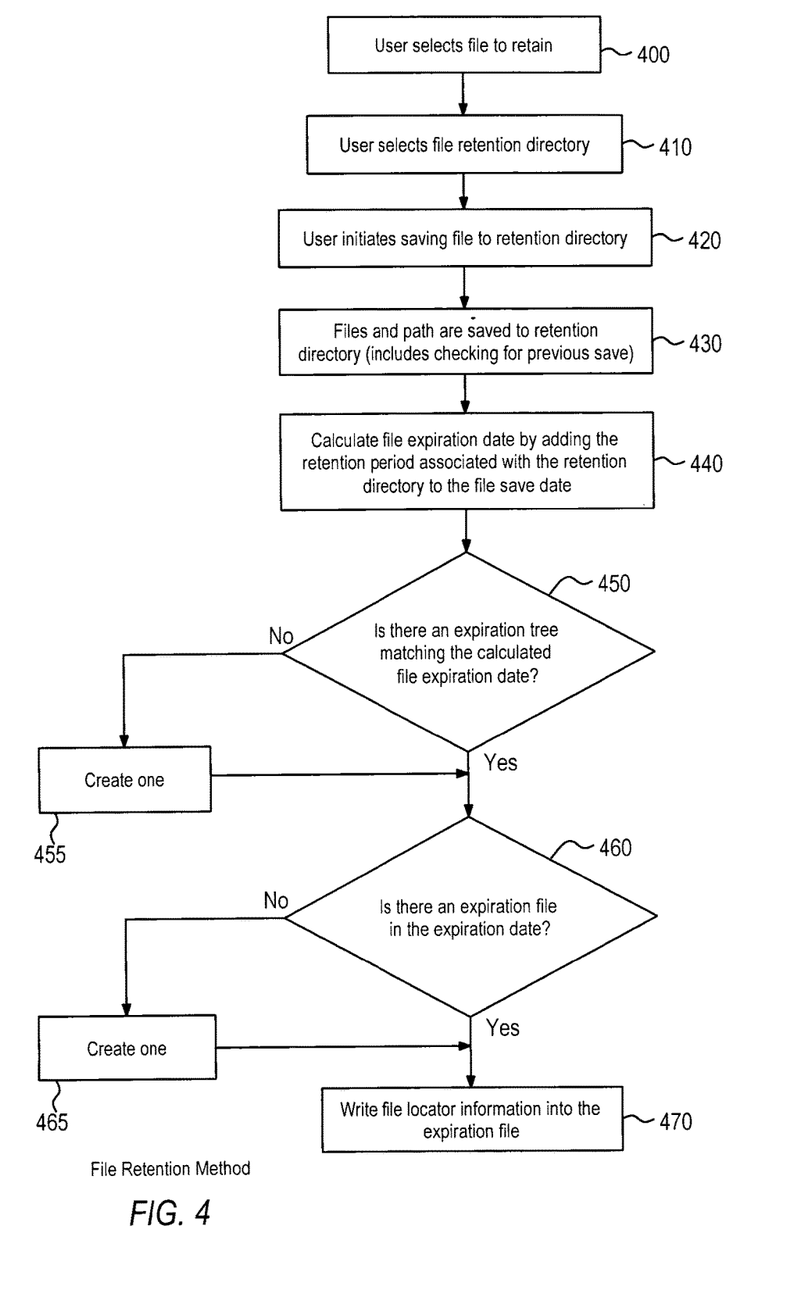
FIG. 4 is a flowchart of an exemplary file retention method.

FIG. 4 is flowchart of an exemplary file retention method of the invention. The method starts with the step 400 of a user selecting a file to retain. Then, in step 410, the user selects a retention directory for that file to be stored. In one embodiment of the invention, that retention directory may include in its name a designator for retention period, or length of time files contained in that directory are to be retained as described in section 2 above. An illustrative example of such a directory would be a directory named "C:\FILEPATH\RETAIN\THREE_YEARS". In this example, the retention period is contained in the directory name itself. An alternative embodiment of the invention might include a directory of the form "C:\FILEPATH\RETAIN\TAX_RECORDS". In that example, the retention period would be associated with the directory name by an external information source, such as a look-up table. In another embodiment of the invention, the user would be able to create new directories if a directory associated with a desired retention period did not exist. In another embodiment, a user would not have that flexibility. In another embodiment, users with higher access rights would be allowed to create retention directories while others were not. A characteristic of directories in the file retention tree is that they and the files they contain cannot be erased by the normal erasure means of the operating system. Rather, they may only be erased or deleted by software specifically authorized to do that.

The next step 420 in the file retention method is for the user to initiate saving the selected file to the previously selected retention directory. In one embodiment, the complete directory structure of the saved file would be recreated in the retention directory. As an illustrative example, a file C:\USER\MYFILES\TAXES.DOC might be saved as C:\KEEPSAFE\RETAIN\THREE-YEARS\USER\MYFILES\TAXES.DOC. As an alternative, only the file name might be saved. In that case, the file would be saved, for example, as C:\KEEPSAFE\RETAIN\THREE_YEARS\TAXES.DOC.

In one embodiment of the invention, the file saving step may also include identification of already saved files of the same name. In such a case, the user may be queried as to whether he or she wished to overwrite the already saved file, or change the name of the new file to be saved.

The next step 440 in the file retention process is to calculate a file expiration date. That is the date on which the file is to expire, and be retained no longer. In one embodiment the date may be as precise as a day. In other embodiments of the invention the expiration date might be a week, month, year, or other measure of time or even selected by the user. The file expiration date is then calculated by adding the retention period associated with the retention directory of step 410 to a file save date. That file save date might be, in one embodiment of the invention, the last date the file was modified before being saved for retention. In another embodiment of the invention, the save date may be the actual date on which the file was saved for retention.

The next step 450 in the file retention process is to determine if there is existence an expiration directory in existence associated with the expiration date of that file. For example, in one embodiment, an expiration directory associated with the expiration date of Jun. 8, 2008 might be of the form C:\KEEPSAFE\EXPIRATION\2008\JUNE\8, thus being relevant to all files set to expire on Jun. 8, 2008. In another alternative embodiment using lower time period resolution, an expiration date might be of the form C:\KEEPSAFE\EXPIRATION\2008\JUNE. In that alternative embodiment, the smallest time increment for setting an expiration date would be a month. Alternative embodiments might limit the date resolution to a year calendar or fiscal quarter, or other time period or be selectable by the user. If such an expiration directory does not exist, then the step 455 would be to create one. If the appropriate expiration directory does exist, the retention process moves directly to step 460.

The next step 460 in the retention process is to determine if an expiration file exists within the expiration directory for the particular expiration date. An expiration file may be a text file, XML or any other file type which can contain a list of files to expire on the same date. If such a file does not exist, then the next step 465 is to create one. If the expiration file does exist there, the retention process moves directly to step 470.

The final step 470 is to write file locator information into the expiration file. Thus, the expiration file within the particular expiration directory of interest will accumulate a complete list of all the files set to expire on the scheduled time (i.e. hour, day, month, year, etc.).

Figure 5:
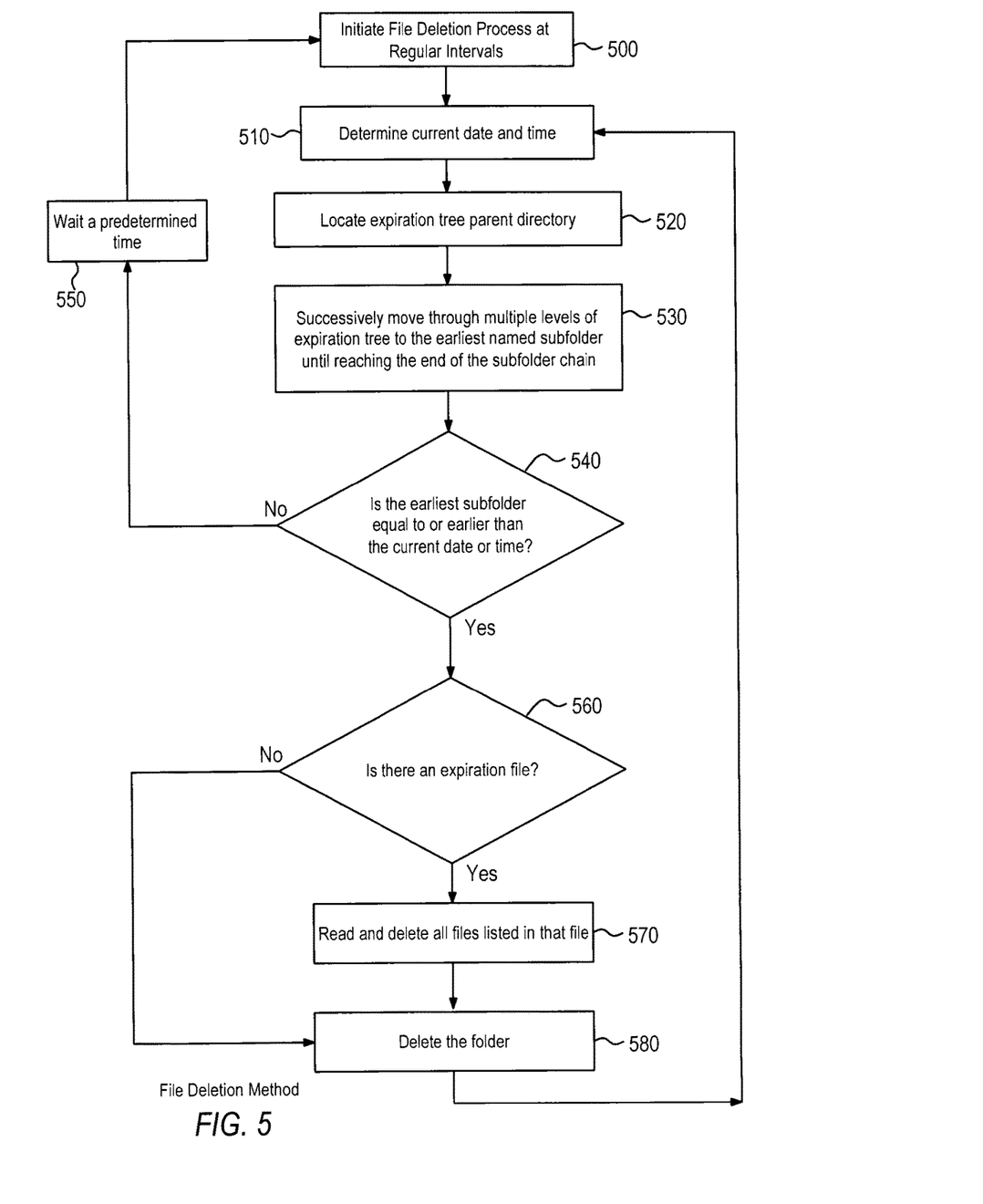
FIG. 5 is a flowchart of an exemplary file deletion method.

FIG. 5 is flowchart of an exemplary file deletion method of the invention. File deletion is desirable as it ensures that any mass storage device used to retain files does not become overloaded due to being filled with files that no longer need to be stored. Furthermore, retention of documents longer than the time imposed by legal requirements may expose business entities to unnecessary legal risk. The file deletion method may begin with the system initiating the file deletion process at regular intervals in step 500. For example, the deletion process interval may be daily, weekly, monthly, yearly, or any other desired unit of time. In one embodiment of the invention, permission may be granted to selected users to determine how often the file deletion process is to occur.

The next step 510 of the file deletion process is to determine the current date and time. Then, in step 520, the parent directory of the expiration tree structure is located. Once the parent expiration directory is located, the next step 530 is to successively move down through any subdirectories until reaching the expiration directory associated with the earliest deletion date. The next step 540 is to compare that earliest deletion date so located with the current date. If the earliest deletion date is later than the current date, the next step 550 is to wait a predetermined interval of time until returning to step 500. That predetermined time may be minutes, hours, days, weeks, months or any other appropriate length of time. In an embodiment of the invention, individual users may be able to set the predetermined time, in another embodiment only authorized system administrators may perform that function.

If the result of step 540 determines that there is an expiration directory with a date associated that is equal to or earlier than the current date, then the deletion process moves on to step 560. Step 560 determines if there is an expiration file associated with that expiration directory. If there is no such expiration file, then the process simply deletes the expiration directory in step 580. However, if there is an expiration file, then the deletion process moves to step 570 where the file identifiers for all files within the expiration file are read and the corresponding files are deleted. If there are no files listed within the expiration directory, then no deletion action needs be taken. After step 570 is completed, the next step 580 is performed to delete the expiration directory as previously described. After step 580, the deletion process returns to step 510 to repeat the process until all expiration folders and their contents associated with expiration dates equal to or earlier than the current date are deleted, and any files identified from reading the expiration files also deleted. In an embodiment of the invention, all deletions of files and directories may be performed by a special software program specifically authorized to do so. In an embodiment of the invention that software program is resident in the kernel portion of a computer operating system.

When the file retention management software is performing a scheduled or periodic delete of expired retained files, the following steps can be used. Determine a current date and the corresponding location in the expiration tree structure (e.g. C:\KEEPSAFE\EXPIRATIONS\2005\JULY\05\EXPIRATIONS.XML). Process the expiration file, line-by-line, and delete each file mentioned (if it exists in the identified retention directory). Note the software must be willing to accept that a file deletion may fail, e.g. due to the file not being present (as in the move case, described above) or due to the file denying deletion. A file may deny deletion if the named file was replaced at some point after the expiration entry was created. In this case the file is not ready to expire. When complete, the software will delete the expirations file and upward delete any parent directories if no additional entries exist. Essentially, the software cleans-up the expiration tree structure as time moves forward.

Figure 6:
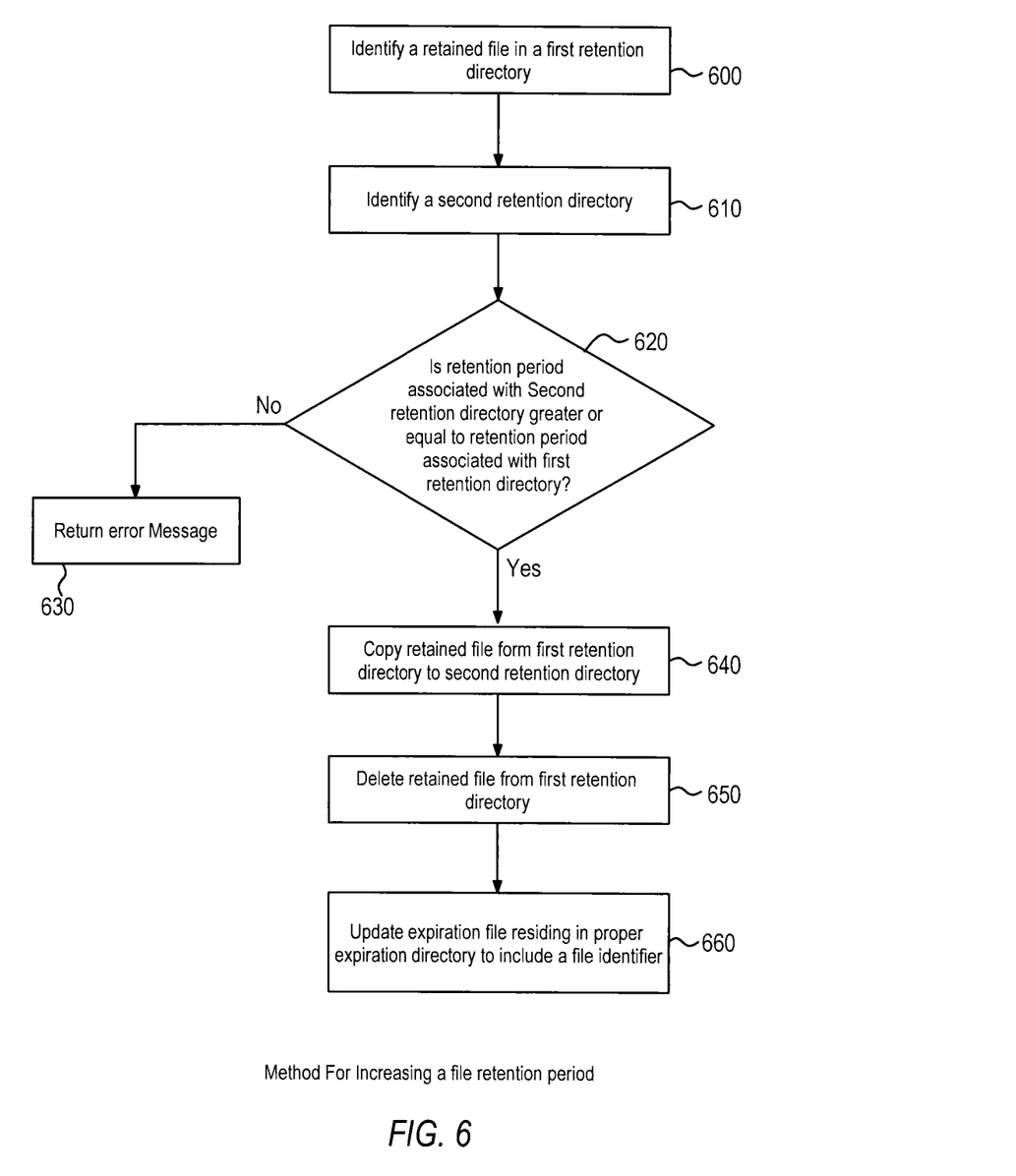
FIG. 6 is a flowchart of a method of increasing the duration of time a file is retained.

FIG. 6 is a flowchart of an exemplary method of increasing the duration of time a file is retained. The first step of this method 600 is to identify a retained file, which the user wishes to retain for a longer period of time than originally specified, in a first retention directory. The second step 610 is to identify a second retention directory associated with a different retention period. One skilled in the art will recognize that in some circumstances, a user might be prohibited from decreasing the storage period for a particular file or category of files, but in other circumstances such action might be allowed. The next optional step 620 is to compare the retention periods of the first and second retention directories. If the retention period associated with the second retention directory is greater than or equal to the retention period associated with a first retention directory, this step 620 will return an error. If it is not, the next step 640 will be to copy the selected file from the first retention directory to the second. The next optional step 650 is to delete the selected file from the first retention directory. Following this, in step 660, an expiration file residing in an expiration directory of an expiration tree structure is updated to include a file identifier of the retained file to be erased on the file expiration date. The expiration directory is associated with a file expiration date corresponding to the second (larger) retention period.

Typical file retention management software may allow a user to later to increase the retention period for a retained file (but not decrease it). For example, a user may "move" a file from a \RETAIN3 YEARS\ retention directory tree to a \RETAIN10 YEARS\ retention directory. Embodiments of the present invention can accommodate this adjustment by updating the appropriate expiration file within the expiration tree structure whenever a retained file is added (or moved) in a retention tree structure. Thus, in the example move from 3-year to 10-year expiration, the file retention management software can add an additional entry in the proper expiration file for the corresponding 10 year expiration directory. Note that there is no need to delete the entry in the expiration file corresponding to the prior 3-year expiration because the retained file simply will not exist at the identified location within the retention tree to be deleted when the old 3-year expiration day occurs. The software will ignore this absence. There will simply be two expiration entries, one indicating the 3 year period within the retention tree (where the retained file was) and one indicating the 10 year period within the retention (where the file currently exists). Even if the retained file is replaced by an identically named file in the 3-year retention directory, an attempt to delete it per the expiration of the first occurrence will fail because the file retention management software logic enforces retention (non-alteration, non-delete) based on the last modified time of a retained file compared to the retention period.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A file expiration management system, comprising:
   at least one computer including a processor, operating system, memory;
   expiration management software stored in the memory and running on the processor under the operating system; and
   at least one mass storage device capable of storing data files from the computer, the mass storage device further comprising a data structure controlled by the running expiration management software, said data structure comprising:
   a file retention directory for storing one or more files to be protected from erasure for a retention period, wherein a retention directory path of the file retention directory comprises the retention period for the one or more files stored within the retention directory path and wherein each of the one or more files is associated with a unique file identifier; and a file expiration directory for storing one or more expiration files, wherein each of the one or more expiration files corresponds to an expiration date and consists of a list of the unique file identifiers for each of the one or more files stored within the retention directory that expire on the expiration date, wherein an expiration directory path of the file expiration directory comprises a year, a month, and a day sequentially named that correspond to the expiration date, wherein the one or more files to be protected from erasure are stored separately from the one or more expiration files and wherein the expiration date for each of the one or more files is calculated by adding the retention period to a saving date of the one or more files in the file retention directory at the time that the one or more file is stored in the file retention directory.

2. The file expiration management system of claim 1, wherein the retention directory is protected from erasure by a kernel mode process that prevents erasure of any files contained in the retention directory.

3. The file expiration management system of claim 1, wherein the file expiration tree structure comprises nested directories where lower directories are named for smaller time increments than higher directories.

4. The file expiration management system of claim 1, wherein the file management software comprises program instructions to prevent deletion of the at least one retained file by any system process except those specifically authorized to do so.

5. The file expiration management system of claim 1, wherein the saving date corresponds to a last modified date the at least one retained file was modified before being saved for retention.

6. The file expiration management system of claim 1, wherein the saving date corresponds to a last saved date the at least one retained file was saved for retention.

7. The file expiration management system of claim 1, wherein a file management software comprises program instructions to prevent deletion of the expiration file, the expiration directory, the at least one retained files, and the retention directory except by functions of the file expiration management software.

8. The file expiration management system of claim 1, wherein the file management software comprises program instructions to perform a file retention method comprising the steps of:
  saving the at least one retained file in the retention directory residing in the file retention tree structure, the retention directory including a designation for the retention period for which the at least one retained file is to be stored after a file saving date of the at least one retained file;
  calculating an expiration date for the at least one retained file by adding the retention period to the file saving date;
  determining whether an expiration directory exists within the file expiration tree structure designated for the calculated expiration date;
  determining whether an expiration file within the expiration directory exists; and
  adding a file identifier of the at least one retained file to the expiration file.

9. The file expiration management system of claim 1, wherein the file management software comprises program instructions to perform a file deletion method comprising the steps of:
  checking the file expiration tree structure at a predetermined time interval to identify an earliest expiration directory associated with an earliest expiration date;
  comparing the earliest expiration date of the earliest expiration directory with a current date;
  determining if there is an expiration file associated with the earliest expiration directory if the expiration date associated with said earliest expiration directory is at least as early as the current date;
  reading and deleting any retention files that can be found that are named within the expiration file; and
  deleting the earliest expiration directory and any contents thereof containing the expiration file referencing the deleted retention files.

10. A method of file expiration management, comprising the steps of:
  saving at least one retained file in a retention directory residing in a file retention tree structure, the retention directory comprising a directory retention name including a designation for a retention period for which the at least one retained file is to be stored after a file saving date of the at least one retained file and wherein each of the at least one retained files is associated with a unique file identifier;
  calculating an expiration date for the at least one retained file by adding the retention period to the file saving date, the calculating performed at the time that the retained file is stored in the retention directory;
  determining whether an expiration directory exists within a file expiration tree structure designated for the expiration date;
  determining whether an expiration file corresponding to the expiration data within the expiration directory exists, the expiration file stored separately from the at least one retained file and consisting of a list of the unique file identifiers for each of the at least one retained file in the retention directory that expires on the expiration date; and
  based on determining that the expiration file corresponding to the expiration data within the expiration directory exists, adding the unique file identifier of the at least one retained file to the expiration file, wherein a directory path of the expiration files in the expiration directory comprises a year, a month, and a day that correspond to the file expiration date.

11. The method of file expiration management of claim 10, further comprising the steps of:
  checking the file expiration tree structure at a predetermined time interval to identify an earliest expiration directory associated with an earliest expiration date;
  comparing the earliest expiration date of the earliest expiration directory with a current date;
  determining if there is an expiration file associated with the earliest expiration directory if the expiration date associated with said earliest expiration directory is at least as early as the current date;
  reading and deleting any retention files that can be found that are named within the expiration file; and
  deleting the earliest expiration directory and any contents thereof containing the expiration file referencing the deleted retention files.

12. The method of file expiration management of claim 10, wherein the saving date corresponds to a last modified date when the at least one retained file was modified before being saved for retention.

13. The method of file expiration management of claim 10, wherein the saving date corresponds to a last saved date when the at least one retained file was saved for retention.

14. The method of file expiration management of claim 10, wherein the file expiration tree structure comprises nested directories where lower directories are named for smaller time increments than higher directories.

* * * * *